United States Patent
Zheng et al.

(10) Patent No.: US 12,146,986 B2
(45) Date of Patent: Nov. 19, 2024

(54) MULTI-CHANNEL LIDAR OPTICAL SUB-ASSEMBLY WITH SHARED OPTICS

(71) Applicant: Lumentum Operations LLC, Milpitas, CA (US)

(72) Inventors: Jiamin Zheng, Ottawa (CA); Barrie P. Keyworth, Ottawa (CA); Josh P. Kemp, Kanata (CA); Michael C. Larson, Oakland, CA (US); Paul Colbourne, Ottawa (CA)

(73) Assignee: Lumentum Operations LLC, San Jose, CA (US)

( * ) Notice: Subject to any disclaimer, the term of this patent is extended or adjusted under 35 U.S.C. 154(b) by 1022 days.

(21) Appl. No.: 16/685,409

(22) Filed: Nov. 15, 2019

(65) Prior Publication Data
US 2021/0063541 A1    Mar. 4, 2021

Related U.S. Application Data

(60) Provisional application No. 62/895,810, filed on Sep. 4, 2019.

(51) Int. Cl.
*G01S 7/481* (2006.01)
*G01S 7/4911* (2020.01)
(Continued)

(52) U.S. Cl.
CPC .......... *G01S 7/4817* (2013.01); *G01S 7/4813* (2013.01); *G01S 7/4814* (2013.01); *G01S 7/4816* (2013.01);
(Continued)

(58) Field of Classification Search
CPC ............................. G01S 7/4817; G01S 7/4811
See application file for complete search history.

(56) References Cited

U.S. PATENT DOCUMENTS 4,750,405 A * 6/1988 deMey, II ................ G12B 5/00
  91/171
6,072,633 A * 6/2000 Park ........................ G02B 5/26
  359/634
(Continued)

FOREIGN PATENT DOCUMENTS

JP    2015114548 A * 6/2015

OTHER PUBLICATIONS

She A, Capasso F. Parallel Polarization State Generation. Sci Rep. May 17, 2016;6:26019 (Year: 2016).*
(Continued)

*Primary Examiner* — Yuqing Xiao
*Assistant Examiner* — Zhengqing Qi
(74) *Attorney, Agent, or Firm* — Harrity & Harrity, LLP

(57) ABSTRACT

An optical device may include a laser component to emit a source beam and an optical component to split the source beam to generate a first beam and a second beam. The optical device may include a multiplexing component to multiplex the first beam and the second beam to form a first multiplexed beam, an optical system to receive the first multiplexed beam and demultiplex the first beam and the second beam, and a scanning component to scan a field of view with the first beam and the second beam and receive the first beam and the second beam reflected from the field of view. The optical system may multiplex the first beam and the second beam reflected from the field of view to form a second multiplexed beam, and a demultiplexing component may demultiplex the first beam and the second beam reflected from the field of view.

16 Claims, 8 Drawing Sheets

(51) Int. Cl.
*G01S 7/4914* (2020.01)
*G01S 7/499* (2006.01)
*G01S 17/34* (2020.01)
*G02B 6/12* (2006.01)
*G02B 27/28* (2006.01)
*H04J 14/02* (2006.01)
*H04J 14/06* (2006.01)

(52) U.S. Cl.
CPC .......... *G01S 7/4911* (2013.01); *G01S 7/4914* (2013.01); *G01S 7/499* (2013.01); *G01S 17/34* (2020.01); *G02B 6/12007* (2013.01); *G02B 27/283* (2013.01); *H04J 14/02* (2013.01); *H04J 14/06* (2013.01)

(56) References Cited

U.S. PATENT DOCUMENTS

| | | | | |
|---|---|---|---|---|
| 2012/0026497 | A1* | 2/2012 | Mathur | G01S 7/499 356/342 |
| 2012/0087004 | A1* | 4/2012 | Kwon | G02F 1/2257 359/326 |
| 2012/0206712 | A1* | 8/2012 | Chang | G01S 17/87 356/28 |
| 2013/0089333 | A1* | 4/2013 | Shen | H04B 10/572 398/79 |
| 2017/0299697 | A1* | 10/2017 | Swanson | G02B 6/29302 |
| 2018/0172994 | A1* | 6/2018 | Robbins | G02B 5/3016 |
| 2019/0257927 | A1* | 8/2019 | Yao | G01S 17/931 |
| 2020/0249350 | A1* | 8/2020 | Schmalenberg | G01S 7/4911 |
| 2020/0300992 | A1* | 9/2020 | Uetsuka | G01S 7/499 |
| 2020/0400798 | A1* | 12/2020 | Rezk | G01S 7/4816 |
| 2021/0116778 | A1* | 4/2021 | Zhang | E06B 9/34 |

OTHER PUBLICATIONS

Robbins et al., "Laser research on an InP-based generic integration platform" Proceedings vol. 9134, Semiconductor Lasers and Laser Dynamics VI; 91340M (Year: 2014).*
Maker et al., "Low-loss silica-on-silicon waveguides" Optics Letters vol. 36, Issue 19, pp. 3729-3731 (Year: 2011).*
Wong et al., "Silicon oxynitride integrated waveguide for on-chip optical interconnects applications" Microelectronics Reliability vol. 48, Issue 2, Feb. 2008, pp. 212-218 (Year: 2008).*
Machine translation of: JP-2015114548-A (Year: 2015).*
Abari et al., WO2015044370A1 (Year: 2015).*

* cited by examiner

MULTI-CHANNEL LIDAR OPTICAL SUB-ASSEMBLY WITH SHARED OPTICS

RELATED APPLICATION

This application claims priority under 35 U.S.C. § 119 to U.S. Provisional Patent Application No. 62/895,810, filed on Sep. 4, 2019, and entitled "Multi-Channel LOSA with Shared Optics," the content of which is incorporated by reference herein in its entirety.

TECHNICAL FIELD

The present disclosure relates generally to light detection and ranging (lidar) optical sub-assemblies and, more particularly, to a multi-channel Lidar Optical Sub-Assembly (LOSA) with shared optics.

BACKGROUND

A frequency-modulated continuous wave (FMCW) lidar system may produce a periodic frequency profile, typically a triangle wave pattern that linearly ramps frequency up and down, on a narrow linewidth laser beam, scan the laser beam across a field of view including one or more objects, receive a beam reflected from objects in the field of view, mix the received beam with a local oscillator beam, taken from a laser source that generated the laser beam, to generate a difference-frequency signal and, based on the frequency difference between the received signal and the local oscillator beam caused by the round trip propagation delay, determine three-dimensional aspects of the one or more objects. For example, the lidar system, based on light reflected from objects in the field of view, may construct a point cloud to determine the three-dimensional aspects of the one or more objects. A conventional FMCW lidar system includes a laser source for emitting a beam, and an optical system for providing the beam to a scanner, receiving light reflected from the field of view and reflected from the scanner or another scanner, and providing the light reflected from the field of view to a coherent receiver which includes a mixer.

SUMMARY

According to some possible implementations, an optical device may include a laser component to emit a source beam, where the laser component includes a frequency-modulated, continuous-wave laser source; an optical component to split the source beam to generate a first beam and a second beam; a multiplexing component to multiplex, using polarization division multiplexing, wavelength division multiplexing, and/or spatial division multiplexing, the first beam and the second beam to form a first multiplexed beam; an optical system to receive the first multiplexed beam and to demultiplex the first multiplexed beam to obtain the first beam and the second beam; a scanning component to: receive, from the optical system, the first beam and the second beam, scan a field of view with the first beam and the second beam, receive the first beam reflected from the field of view and the second beam reflected from the field of view, and provide the first beam reflected from the field of view and the second beam reflected from the field of view to the optical system, where the optical system is to multiplex the first beam reflected from the field of view and the second beam reflected from the field of view to form a second multiplexed beam reflected from the field of view; a demultiplexing component to receive, from the optical system, the second multiplexed beam reflected from the field of view and demultiplex, using polarization division demultiplexing, wavelength division demultiplexing, and/or spatial division demultiplexing, the second multiplexed beam reflected from the field of view to obtain the first beam reflected from the field of view and the second beam reflected from the field of view; a first receiver to receive, from the demultiplexing component, the first beam reflected from the field of view; and a second receiver to receive, from the demultiplexing component, the second beam reflected from the field of view.

According to some possible implementations, an optical device may include a laser component to emit a frequency-modulated source beam; an optical component to split the frequency-modulated source beam to generate a first beam and a second beam having different spatial offsets; a multiplexing component to multiplex, using spatial division multiplexing, the first beam and the second beam to form a first multiplexed beam; an optical system to receive the first multiplexed beam and to demultiplex the first multiplexed beam to obtain the first beam and the second beam; a scanning component to: receive, from the optical system, the first beam and the second beam, scan a field of view with the first beam and the second beam, receive the first beam reflected from the field of view and the second beam reflected from the field of view, and provide the first beam reflected from the field of view and the second beam reflected from the field of view to the optical system, where the optical system is to multiplex the first beam reflected from the field of view and the second beam reflected from the field of view to form a second multiplexed beam reflected from the field of view; a demultiplexing component to receive, from the optical system, the second multiplexed beam reflected from the field of view and demultiplex, using spatial division demultiplexing, the second multiplexed beam reflected from the field of view to obtain the first beam reflected from the field of view and the second beam reflected from the field of view; a first receiver to receive, from the demultiplexing component, the first beam reflected from the field of view; and a second receiver to receive, from the demultiplexing component, the second beam reflected from the field of view.

According to some possible implementations, an optical device may include a laser component to emit a frequency-modulated source beam; an optical component to split the frequency-modulated source beam to generate a first beam and a second beam; a multiplexing component to multiplex the first beam and the second beam to form a first multiplexed beam; an optical system to receive the first multiplexed beam and to demultiplex the first multiplexed beam to obtain the first beam and the second beam; a scanning component to: receive, from the optical system, the first beam and the second beam, scan a field of view with the first beam and the second beam, receive the first beam reflected from the field of view and the second beam reflected from the field of view, and provide the first beam reflected from the field of view and the second beam reflected from the field of view to the optical system, where the optical system is to multiplex the first beam reflected from the field of view and the second beam reflected from the field of view to form a second multiplexed beam reflected from the field of view; a demultiplexing component to receive, from the optical system, the second multiplexed beam reflected from the field of view and demultiplex the second multiplexed beam reflected from the field of view to obtain the first beam reflected from the field of view and the second beam reflected from the field of view; a first receiver to receive, from the demultiplexing component, the first beam reflected from the field of view; and a second receiver to receive, from the demultiplexing component, the second beam reflected from the field of view.

DETAILED DESCRIPTION

The following detailed description of example implementations refers to the accompanying drawings. The same reference numbers in different drawings may identify the same or similar elements.

As described above, a conventional FMCW lidar system may scan a beam across a field of view. Increasing the number of beams (e.g., channels) used by the lidar system may increase the field of view and/or increase a density of the point cloud used to determine the three-dimensional aspects of the one or more objects in the field of view. However, adding a second beam to a conventional lidar system may require an additional laser source, an additional optical system, and an additional scanner. Thus, adding a second beam to a conventional lidar system may double the cost of the lidar system.

Some implementations described herein provide an optical device that may include a laser component to emit a frequency-modulated source beam, an optical component to split the frequency-modulated source beam to generate a first beam and a second beam, a multiplexing component to multiplex the first beam and the second beam to form a first multiplexed beam, an optical system to receive the first multiplexed beam and to demultiplex the first beam and the second beam, and a scanning component to scan a field of view with the first beam and the second beam. In some implementations, the scanning component may receive the first beam and the second beam reflected from the field of view and provide the first beam and the second beam reflected from the field of view to the optical system.

In some implementations, the optical system may multiplex the first beam and the second beam reflected from the field of view to form a second multiplexed beam reflected from the field of view. In some implementations, the optical device may include a demultiplexing component to receive, from the optical system, the second multiplexed beam reflected from the field of view and demultiplex the first beam and the second beam reflected from the field of view. In some implementations, the optical device may include a first receiver to receive, from the demultiplexing component, the first beam reflected from the field of view and a second receiver to receive, from the demultiplexing component, the second beam reflected from the field of view.

In this way, the optical device may scan a field of view with multiple beams using a single laser component, a single optical system, and a single scanning component, thereby adding a second beam without doubling the cost of the optical device. Additionally, or alternatively, the optical device may include an optical component to split the source beam into three or more beams, which further increases the field of view and/or the density of the point cloud without increasing the cost of the optical device by a factor equivalent to the number of beams.

Figure 1A:
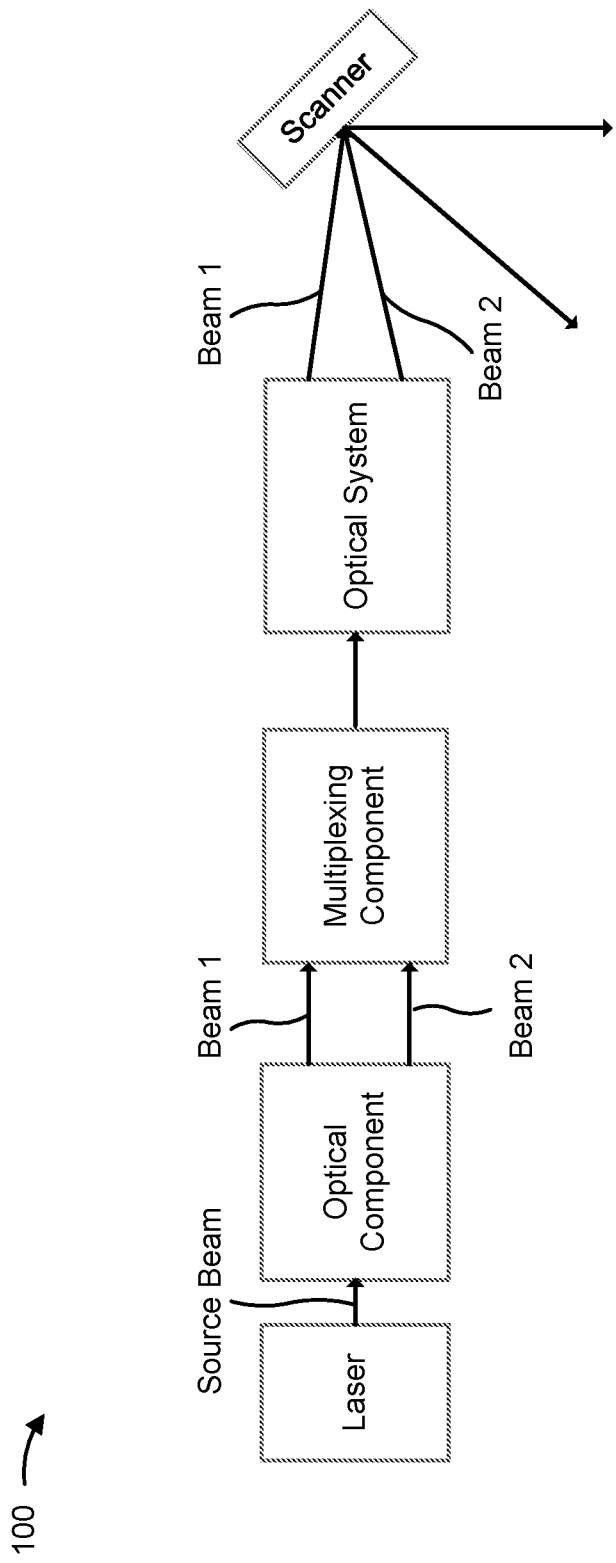
FIGS. 1A-1B are diagrams of an example optical device described herein.
Figure 1B:
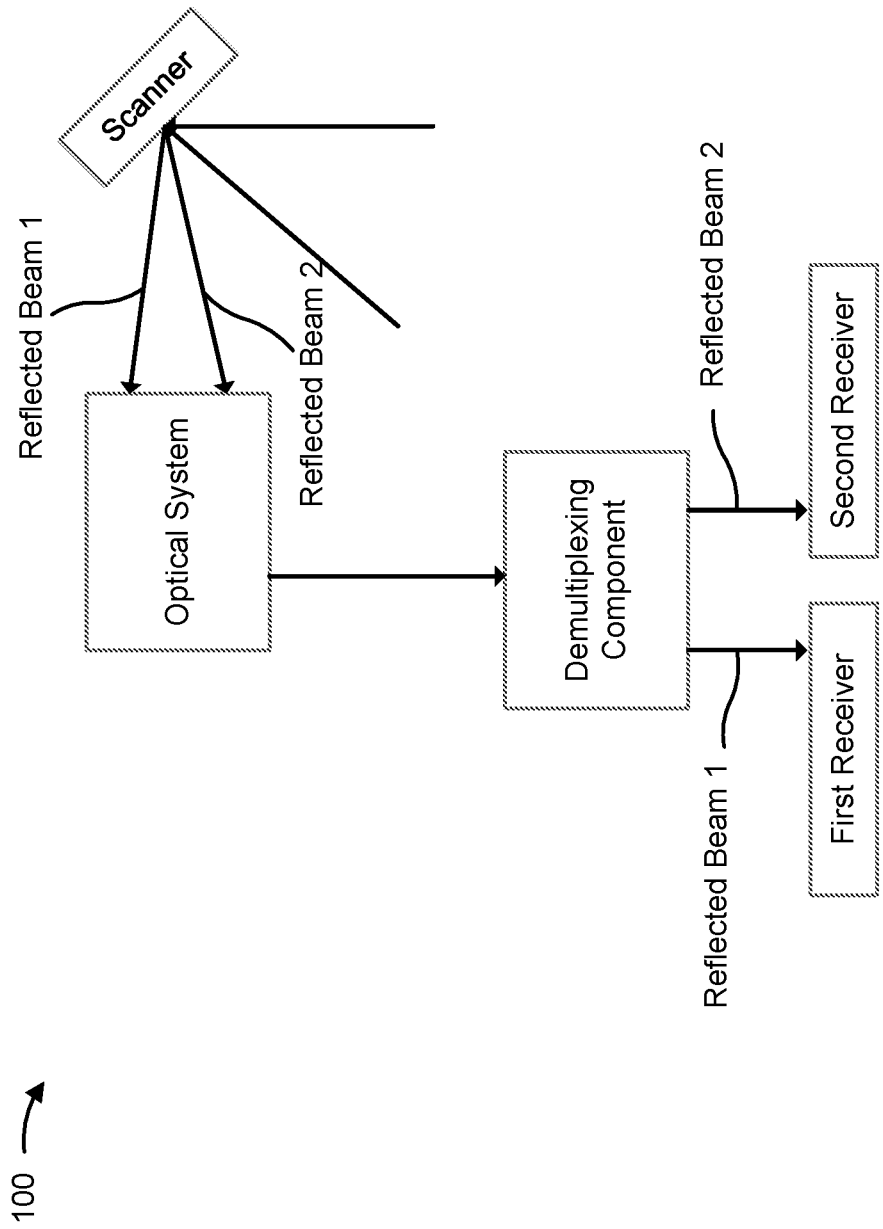

FIGS. 1A-1B are diagrams of an example optical device 100 described herein. As shown in FIGS. 1A-1B, the optical device 100 may include a laser, an optical component, a multiplexing component, an optical system, a scanner, a demultiplexing component, a first receiver, and a second receiver.

As shown in FIG. 1A, the laser may emit a source beam. In some implementations, the laser may emit a frequency-modulated source beam. For example, the laser may include a frequency-modulated, continuous-wave laser source. In some implementations, the laser may include a narrow-line-width laser source. In some implementations, the laser may include an integrated indium phosphide laser. For example, the laser may include a frequency-modulated, continuous-wave, narrow-line-width, integrated indium phosphide laser.

As shown in FIG. 1A, the optical component may split the source beam to generate a first beam (Beam 1) and a second beam (Beam 2). In some implementations, the optical component may receive, from the laser, the frequency-modulated source beam and may split the frequency-modulated source beam to generate the first beam and the second beam.

In some implementations, the optical component may split the frequency-modulated source beam to generate the first beam and the second beam, where the first beam and the second beam have orthogonal polarizations. For example, the optical component may include a polarization beam splitter that splits the frequency-modulated source beam to generate the first beam having a first polarization and the second beam having a second polarization, where the first polarization is orthogonal to the second polarization.

In some implementations, the optical component may split the frequency-modulated source beam to generate the first beam and the second beam, where the first beam and the second beam have different wavelengths. For example, the optical component may include a dichroic beam splitter that splits the frequency-modulated source beam to generate the first beam having a first wavelength and the second beam having a second wavelength. In some implementations, the optical component may split the frequency-modulated source beam to generate three or more beams having different wavelengths, such as a first beam having a first wavelength, a second beam having a second wavelength, and a third beam having a third wavelength, where the first beam has a different wavelength from the second beam and the third beam, and the second beam has a different wavelength from the third beam.

In some implementations, the optical component may split the frequency-modulated source beam to generate the first beam and the second beam, where the first beam and the second beam have different spatial and/or angular offsets. For example, the optical component may include a beam splitter to split the frequency-modulated source beam to generate the first beam having a first spatial and/or angular offset and the second beam having a second spatial and/or angular offset.

In some implementations, the optical component may include one or more amplifiers to amplify beams generated by splitting the frequency-modulated source beam. For example, the optical component may include a first amplifier to amplify the first beam and a second amplifier to amplify the second beam. In some implementations, the one or more amplifiers may include a solid-state amplifier, a semiconductor optical amplifier (SOA), and/or the like.

In some implementations, the optical component may include the beam splitter and one or more amplifiers in an integrated component. For example, the beam splitter and an array of SOAs (e.g., a first SOA for the first beam, a second SOA for the second beam, and/or the like) may be integrated.

As shown in FIG. 1A, the multiplexing component may multiplex the first beam and the second beam to form a first multiplexed beam. In some implementations, the multiplexing component may use polarization division multiplexing, wavelength division multiplexing, spatial division multiplexing, and/or the like to multiplex the first beam and the second beam to form the first multiplexed beam.

In some implementations, the laser, the optical component, and/or the multiplexing component may be integrated. For example, the laser, the amplifiers, the optical component, and/or the multiplexing component may be on a photonic integrated chip (PIC).

As shown in FIG. 1A, the optical system may receive the first multiplexed beam and may demultiplex the first beam and the second beam. For example, the optical system may demultiplex the first beam and the second beam from the first multiplexed beam. In some implementations, the optical system may use polarization division demultiplexing, wavelength division demultiplexing, spatial division demultiplexing, and/or the like to demultiplex the first beam and the second beam. In some implementations, the optical system may include a circulator, one or more beam splitters, one or more lenses, one or more dispersive optics, and/or the like.

As shown in FIG. 1A, the scanner may receive, from the optical system, the first beam and the second beam and may scan a field of view with the first beam and the second beam. In some implementations, the scanner may include one or more moveable mirrors to scan the field of view with the first beam and the second beam. For example, the scanner may include one or more mirrors that rotate along two axes to scan the field of view with the first beam and the second beam in two dimensions. In some implementations, the scanner may include a silicon micro-electromechanical system (MEMS).

In some implementations, the scanner may receive the first beam and the second beam at different angles, as shown in FIG. 1A. When the scanner receives the first beam and the second beam at different angles, the scanner may reflect the first beam and the second beam at different angles from each other to scan the field of view.

As shown in FIG. 1B, the scanner may receive the first beam and the second beam reflected from the field of view (Reflected Beam 1 and Reflected Beam 2, respectively) and may provide the first beam and the second beam reflected from the field of view to the optical system. In some implementations, the scanner may include one or more moveable mirrors to receive the first beam and the second beam reflected from the field of view, and may provide the first beam and the second beam reflected from the field of view to the optical system. For example, the scanner may include one or more moveable mirrors to scan the field of view with the first beam and the second beam and receive the first beam and the second beam reflected from the field of view.

As shown in FIG. 1B, the optical system may multiplex the first beam and the second beam reflected from the field of view to form a second multiplexed beam reflected from the field of view (e.g., a multiplexed beam of reflected beams). In some implementations, the optical system may use polarization division multiplexing, wavelength division multiplexing, spatial division multiplexing, and/or the like to multiplex the first beam and the second beam reflected from the field of view to form the second multiplexed beam reflected from the field of view. For example, the optical system, to multiplex the first beam and the second beam reflected from the field of view, may use the same components (e.g., a circulator, one or more beam splitters, one or more lenses, one or more dispersive optics, and/or the like) used to demultiplex the first beam and the second beam as shown in FIG. 1A.

As shown in FIG. 1B, the demultiplexing component may receive, from the optical system, the second multiplexed beam reflected from the field of view and demultiplex the first beam and the second beam reflected from the field of view. For example, the demultiplexing component may demultiplex the first beam and the second beam reflected from the field of view from the second multiplexed beam reflected from the field of view. In some implementations, the demultiplexing component may use polarization division demultiplexing, wavelength division demultiplexing, spatial division demultiplexing, and/or the like to demultiplex the first beam and the second beam reflected from the field of view. In some implementations, the demultiplexing component may include a circulator, one or more beam splitters, one or more lenses, one or more dispersive optics, and/or the like.

As shown in FIG. 1B, the first receiver may receive, from the demultiplexing component, the first beam reflected from the field of view and the second receiver may receive, from the demultiplexing component, the second beam reflected from the field of view. In some implementations, the first receiver and/or the second receiver may include one or more photodiodes (e.g., an array of photodiodes and/or the like) and/or the like. For example, the first receiver and/or the second receiver may include a silica-on-silicon waveguide receiver, a silicon oxynitride-on-silicon waveguide receiver, and/or the like. In some implementations, the first receiver and the second receiver may be on a photonic integrated chip (PIC).

In some implementations, the first receiver and/or the second receiver may convert the first beam and/or the second beam reflected from the field of view into an electrical signal, which the optical device 100 may use to construct a point cloud to determine three-dimensional aspects of an object in the field of view.

In some implementations, the optical device 100 may include a local oscillator beam, which may be a portion of the first beam and/or a portion of the second beam. In some implementations, the optical device 100 may include one or more mixers to receive the local oscillator portion of the first beam and mix the first beam reflected from the field of view with the portion of the first beam to generate a mixed first beam. In some implementations, the one or more mixers may receive the local oscillator portion of the second beam and mix the second beam reflected from the field of view with the portion of the second beam to generate a mixed second beam.

In some implementations, the first receiver may receive, from the one or more mixers, the mixed first beam and may generate a first difference-frequency signal. In some implementations, the second receiver may receive, from the one or more mixers, the mixed second beam to generate a second difference-frequency signal. In some implementations, the optical device 100 may, based on the first difference-frequency signal and/or the second difference-frequency signal, determine three-dimensional aspects of an object in the field of view.

In some implementations, the optical device 100 may include a delay-line interferometer, which may be used as a frequency reference for controlling the laser. For example, the first receiver, the second receiver, and the delay-line interferometer may be integrated. In some implementations, the delay-line interferometer may receive, from the local oscillator and/or the one or more mixers, a portion of the first beam and/or a portion of the second beam and may provide frequency feedback to control the laser.

In some implementations, the optical device 100 may include an optomechanical bench to hold one or more components of the optical device 100. For example, the optomechanical bench may hold the laser, the optical component, the multiplexing component, the optical system, the scanner, the demultiplexing component, the first receiver, and/or the second receiver. In some implementations, the optical device 100 may include an optomechanical bench to hold the laser, the optical component, the multiplexing component, the optical system, and the scanner. In some implementations, the optomechanical bench may maintain optical and/or mechanical alignment of components of the optical device 100.

In some implementations, the optical device 100 may include a housing surrounding one or more components of the optical device 100. For example, the housing may surround the laser, the optical component, the multiplexing component, the optical system, the scanner, the demultiplexing component, the first receiver, the second receiver, and/or the optomechanical bench. In some implementations, the optical device 100 may include a housing surrounding the laser, the optical component, the multiplexing component, the optical system, the scanner, and the demultiplexing component. In some implementations, the housing may be sealed (e.g., hermetically sealed and/or the like) to prevent external gas, dust, debris, and/or the like from affecting the components of the optical device 100.

In some implementations, the housing may include a window through which the scanner may scan the field of view with the first beam and the second beam. For example, the window may transmit light, be scratch-resistant, and protect the components of the optical device 100. In some implementations, the window may include a glass substrate, a sapphire substrate, and/or the like.

In this way, the optical device 100 may scan the field of view with two beams, the first beam and the second beam, using a single laser, a single optical system, and a single scanner, thereby adding a second beam without a corresponding increase in the cost of the optical device 100.

Figure 2A:
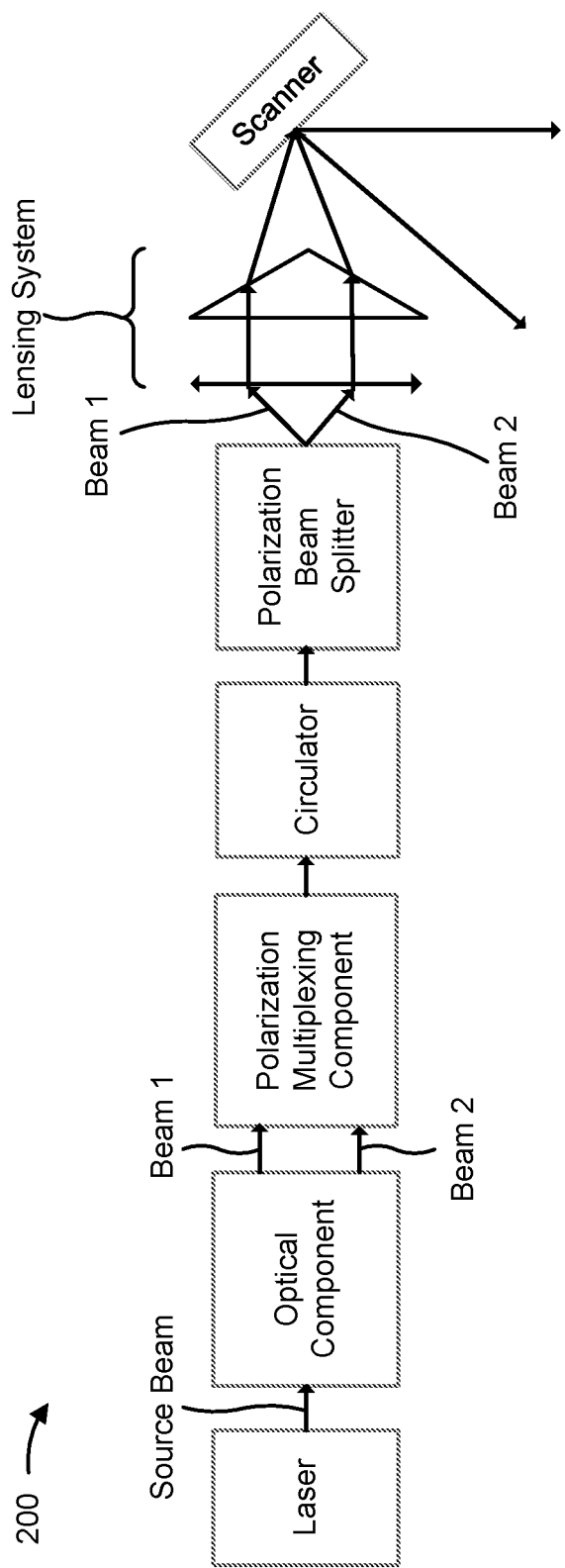
FIGS. 2A-2B are diagrams of an example optical device using polarization division multiplexing described herein.
Figure 2B:
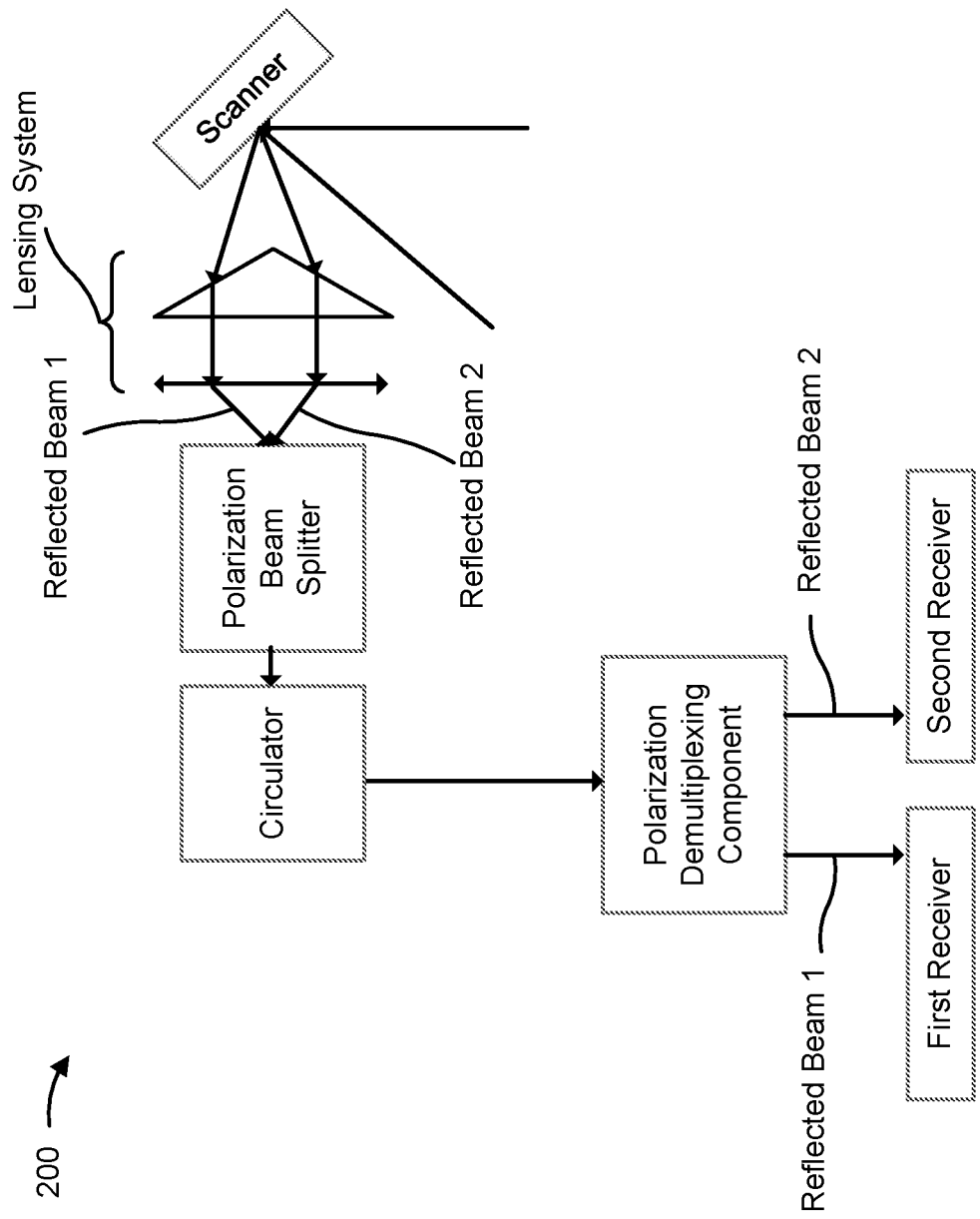

FIGS. 2A-2B are diagrams of an example optical device 200 using polarization division multiplexing described herein. As shown in FIGS. 2A-2B, the optical device 200 may include a laser, an optical component, a polarization multiplexing component, a circulator, a polarization beam splitter, a lensing system, a scanner, a polarization demultiplexing component, a first receiver, and a second receiver.

As shown in FIG. 2A, the laser may emit a source beam. In some implementations, the laser may emit a frequency-modulated source beam. For example, the laser may include a frequency-modulated, continuous-wave laser source. In some implementations, the laser may include a narrow-linewidth laser source. In some implementations, the laser may include an integrated indium phosphide laser. For example, the laser may include a frequency-modulated, continuous-wave, narrow-line-width, integrated indium phosphide laser.

As shown in FIG. 2A, the optical component may split the source beam to generate a first beam (Beam 1) and a second beam (Beam 2), where the first beam and the second beam have orthogonal polarizations. For example, the optical component may include a polarization beam splitter that splits the frequency-modulated source beam to generate the first beam having a first polarization and the second beam having a second polarization, where the first polarization is orthogonal to the second polarity.

In some implementations, the optical component may include one or more amplifiers (not shown) to amplify beams generated by splitting the frequency-modulated source beam. For example, the optical component may include a first amplifier to amplify the first beam and a second amplifier to amplify the second beam. In some implementations, the one or more amplifiers may include a solid-state amplifier, a semiconductor optical amplifier (SOA), and/or the like.

As shown in FIG. 2A, the polarization multiplexing component may multiplex the first beam and the second beam to form a first multiplexed beam. For example, the polarization multiplexing component may use polarization division multiplexing to multiplex the first beam and the second beam to form the first multiplexed beam.

In some implementations, the laser, the optical component, and/or the polarization multiplexing component may be integrated. For example, the laser, the optical component, and/or the polarization multiplexing component may be on a photonic integrated chip (PIC).

As shown in FIG. 2A, the circulator may receive the first multiplexed beam. In some implementations, the circulator may have multiple ports and may direct the first multiplexed beam from one port to another port to prevent the first multiplexed beam from propagating in an unintended direction. For example, the circulator may direct the first multiplexed beam to the polarization beam splitter instead of back to the polarization multiplexing component or to the polarization demultiplexing component (shown in FIG. 2B).

As shown in FIG. 2A, the polarization beam splitter may receive the first multiplexed beam and split the first multiplexed beam to generate the first beam (Beam 1) and the second beam (Beam 2). In some implementations, the polarization beam splitter may include a cube beam splitter constructed of two right angle prisms having hypotenuse surfaces joined together, where one of the hypotenuse surfaces may be coated with a dielectric beam splitting coating. Additionally, or alternatively, the polarization beam splitter may include a plate beam splitter having a surface coated with a dielectric beam splitting coating. In some implementations, the polarization beam splitter may include a lateral displacement beam splitter that may split the first multiplexed beam to generate the first beam and the second beam, where the first beam and the second beam are parallel.

As shown in FIG. 2A, the lensing system may receive the first beam and the second beam from the polarization beam splitter. In some implementations, the lensing system may include a converging lens that may receive the first beam and the second beam from the polarization beam splitter and refract the first beam and the second beam such that the first beam and the second beam are parallel. For example, the converging lens may have a focal point, where the converging lens is placed such that the polarization beam splitter emits the first beam and the second beam at the focal point of the converging lens. In some implementations, the lensing system may include a prism that may refract the first beam and the second beam such that the first beam and the second beam are directed onto the same location on the scanner. Additionally, or alternatively, the lensing system may include one or more additional lenses, such as simple lenses (e.g., converging lenses, diverging lenses, and/or the like)

and/or compound lenses, one or more optical elements (e.g., prisms, mirrors, and/or the like), and/or the like.

As shown in FIG. 2A, the scanner may receive, from the lensing system, the first beam and the second beam and may scan a field of view with the first beam and the second beam. In some implementations, the scanner may include one or more moveable mirrors to scan the field of view with the first beam and the second beam. For example, the scanner may include one or more mirrors that rotate along two axes to scan the field of view with the first beam and the second beam in two dimensions. In some implementations, the scanner may include a silicon MEMS.

In some implementations, the scanner may receive the first beam and the second beam at different angles, as shown in FIG. 2A. When the scanner receives the first beam and the second beam at different angles, the scanner may reflect the first beam and the second beam at different angles from each other to scan the field of view.

As shown in FIG. 2B, the scanner may receive the first beam and the second beam reflected from the field of view (Reflected Beam 1 and Reflected Beam 2, respectively) and may provide the first beam and the second beam reflected from the field of view to the lensing system. In some implementations, the scanner may include one or more moveable mirrors to receive the first beam and the second beam reflected from the field of view and may provide the first beam and the second beam reflected from the field of view to the lensing system. For example, the scanner may include one or more moveable mirrors to scan the field of view with the first beam and the second beam and receive the first beam and the second beam reflected from the field of view.

As shown in FIG. 2B, the lensing system may receive, from the scanner, the first beam and the second beam reflected from the field of view. In some implementations, the prism of the lensing system may refract the first beam and the second beam reflected from the field of view such that the first beam and the second beam reflected from the field of view are parallel. In some implementations, the converging lens may receive the first beam and the second beam reflected from the field of view and refract the first beam and the second beam reflected from the field of view. For example, the converging lens may refract the first beam and the second beam reflected from the field of view to the focal point of the converging lens, where the polarization beam splitter may be positioned.

As shown in FIG. 2B, the polarization beam splitter may receive the first beam and the second beam reflected from the field of view and may multiplex the first beam and the second beam reflected from the field of view to form a second multiplexed beam reflected from the field of view (e.g., a multiplexed beam of reflected beams). In some implementations, the polarization beam splitter may have optical properties such that when the first multiplexed beam is incident on a first surface of the polarization beam splitter, the polarization beam splitter may emit the first beam and the second beam from a second surface of the polarization beam splitter, as shown in FIG. 2A. Additionally, or alternatively, the polarization beam splitter may have optical properties such that when the first beam and the second beam reflected from the field of view are incident on the second surface, the polarization beam splitter may emit, from the first surface, the second multiplexed beam reflected from the field of view.

As shown in FIG. 2B, the circulator may receive the second multiplexed beam reflected from the field of view. In some implementations, the circulator may direct the second multiplexed beam reflected from the field of view to the polarization demultiplexing component instead of back to the polarization beam splitter or to the polarization multiplexing component.

As shown in FIG. 2B, the polarization demultiplexing component may receive, from the circulator, the second multiplexed beam reflected from the field of view and demultiplex, using polarization division demultiplexing, the first beam and the second beam reflected from the field of view. For example, the polarization demultiplexing component may demultiplex the first beam and the second beam reflected from the field of view from the second multiplexed beam reflected from the field of view. In some implementations, the polarization demultiplexing component may include a circulator, one or more beam splitters, one or more lenses, one or more dispersive optics, and/or the like.

As shown in FIG. 2B, the first receiver may receive, from the polarization demultiplexing component, the first beam reflected from the field of view, and the second receiver may receive, from the polarization demultiplexing component, the second beam reflected from the field of view. In some implementations, the first receiver and/or the second receiver may include one or more photodiodes (e.g., an array of photodiodes), and/or the like. For example, the first receiver and/or the second receiver may include a silica-on-silicon waveguide receiver, a silicon oxynitride-on-silicon waveguide receiver, and/or the like. In some implementations, the first receiver and the second receiver may be on a photonic integrated chip (PIC).

In some implementations, the first receiver and/or the second receiver may convert the first beam and/or the second beam reflected from the field of view into an electrical signal, which the optical device 200 may use to construct a point cloud to determine three-dimensional aspects of an object in the field of view.

In some implementations, the optical device 200 may include a local oscillator beam, which may be a portion of the first beam and/or a portion of the second beam. In some implementations, the optical device 200 may include one or more mixers to receive the local oscillator portion of the first beam and mix the first beam reflected from the field of view with the portion of the first beam to generate a mixed first beam. In some implementations, the one or more mixers may receive the local oscillator portion of the second beam and mix the second beam reflected from the field of view with the portion of the second beam to generate a mixed second beam.

In some implementations, the first receiver may receive, from the one or more mixers, the mixed first beam and may generate a first difference-frequency signal. In some implementations, the second receiver may receive, from the one or more mixers, the mixed second beam to generate a second difference-frequency signal. In some implementations, the optical device 200 may, based on the first difference-frequency signal and/or the second difference-frequency signal, determine three-dimensional aspects of an object in the field of view.

In some implementations, the optical device 200 may include a delay-line interferometer, which may be used as a frequency reference for controlling the laser. For example, the first receiver, the second receiver, and the delay-line interferometer may be integrated. In some implementations, the delay-line interferometer may receive, from the local oscillator and/or the one or more mixers, a portion of the first beam and/or a portion of the second beam and may provide frequency feedback to control the laser.

In some implementations, the optical device 200 may include an optomechanical bench to hold one or more components of the optical device 200. For example, the optomechanical bench may hold the laser, the optical component, the polarization multiplexing component, the circulator, the polarization beam splitter, the lensing system, the scanner, the polarization demultiplexing component, the first receiver, and/or the second receiver. In some implementations, the optomechanical bench may maintain optical and/or mechanical alignment of components of the optical device 200.

In some implementations, the optical device 200 may include a housing surrounding one or more components of the optical device 200. For example, the housing may surround the laser, the optical component, the polarization multiplexing component, the circulator, the polarization beam splitter, the lensing system, the scanner, the polarization demultiplexing component, the first receiver, the second receiver, and/or the optomechanical bench. In some implementations, the housing may be sealed (e.g., hermetically sealed and/or the like) to prevent external gas, dust, debris, and/or the like from affecting the components of the optical device 200.

In some implementations, the housing may include a window through which the scanner may scan the field of view with the first beam and the second beam. For example, the window may transmit light, be scratch-resistant, and/or protect the components of the optical device 200. In some implementations, the window may include a glass substrate, a sapphire substrate, and/or the like.

In this way, the optical device 200 may scan the field of view with two beams, the first beam and the second beam, using a single laser, a single optical system, and a single scanner, thereby adding a second beam without doubling the cost of the optical device 200.

Figure 3A:
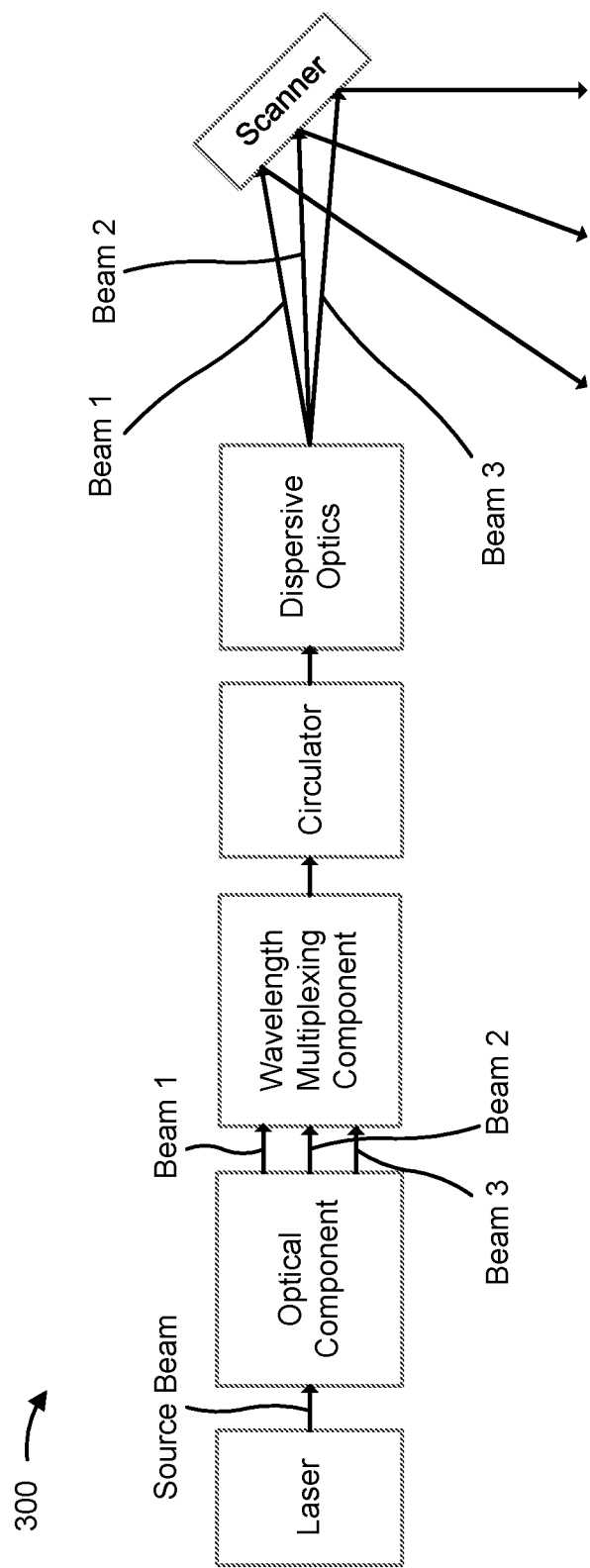
FIGS. 3A-3B are diagrams of an example optical device using wavelength division multiplexing described herein.
Figure 3B:
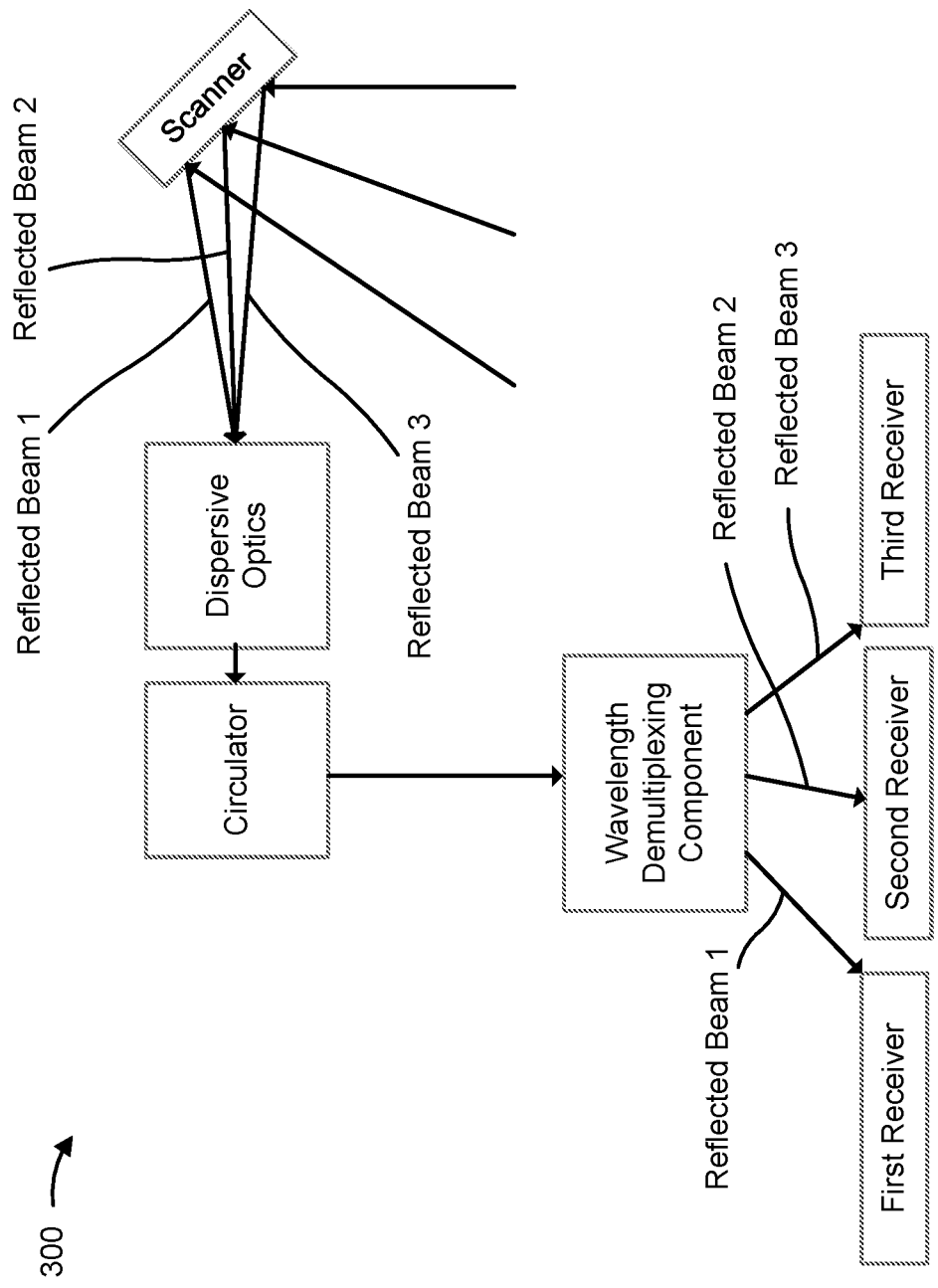

FIGS. 3A-3B are diagrams of an example optical device 300 using wavelength division multiplexing described herein. As shown in FIGS. 3A-3B, the optical device 300 may include a laser, an optical component, a wavelength multiplexing component, a circulator, dispersive optics, a scanner, a wavelength demultiplexing component, a first receiver, a second receiver, and a third receiver.

As shown in FIG. 3A, the laser may emit a source beam. In some implementations, the laser may emit a frequency-modulated source beam. For example, the laser may include a frequency-modulated, continuous-wave laser source. In some implementations, the laser may include a narrow-line-width laser source. In some implementations, the laser may include an integrated indium phosphide laser. For example, the laser may include a frequency-modulated, continuous-wave, narrow-line-width, integrated indium phosphide laser.

As shown in FIG. 3A, the optical component may split the source beam to generate a first beam (Beam 1), a second beam (Beam 2), and a third beam (Beam 3), where the first beam has a different wavelength from the second beam and the third beam, and the second beam has a different wavelength from the third beam. For example, the optical component may include a dichroic beam splitter that splits the frequency-modulated source beam to generate the first beam having a first wavelength, the second beam having a second wavelength, and the third beam having a third wavelength. Additionally, or alternatively, the optical component may include a dispersive element, such as a prism, a grating, and/or the like.

In some implementations, the optical component may include one or more amplifiers to amplify beams generated by splitting the frequency-modulated source beam. For example, the optical component may include a first amplifier to amplify the first beam, a second amplifier to amplify the second beam, and a third amplifier to amplify the third beam. In some implementations, the one or more amplifiers may include a solid-state amplifier, a semiconductor optical amplifier (SOA), and/or the like.

As shown in FIG. 3A, the wavelength multiplexing component may multiplex the first beam, the second beam, and the third beam to form a first multiplexed beam. For example, the polarization multiplexing component may use wavelength division multiplexing to multiplex the first beam, the second beam, and the third beam to form the first multiplexed beam.

In some implementations, the laser, the optical component, and/or the wavelength multiplexing component may be integrated. For example, the laser, the optical component, and/or the wavelength multiplexing component may be on a photonic integrated chip (PIC).

As shown in FIG. 3A, the circulator may receive the first multiplexed beam. In some implementations, the circulator may have multiple ports and may direct the first multiplexed beam from one port to another port to prevent the first multiplexed beam from propagating in an unintended direction. For example, the circulator may direct the first multiplexed beam to the dispersive optics instead of back to the wavelength multiplexing component or to the wavelength demultiplexing component (shown in FIG. 3B).

As shown in FIG. 3A, the dispersive optics may receive the first multiplexed beam and split the first multiplexed beam to generate the first beam (Beam 1), the second beam (Beam 2), and the third beam (Beam 3). In some implementations, the dispersive optics may include a dichroic beam splitter, a prism, a grating, and/or the like. Additionally, or alternatively, the dispersive optics may include one or more lenses, one or more mirrors, and/or the like. In some implementations, the dispersive optics and the scanner may be integrated (e.g., a grating on a silicon MEMS and/or the like). In some implementations, the dispersive optics may be integrated with the circulator, other optical elements, and/or the like.

As shown in FIG. 3A, the scanner may receive, from the dispersive optics, the first beam, the second beam, and the third beam and may scan a field of view with the first beam, the second beam, and the third beam. In some implementations, the scanner may include one or more moveable mirrors to scan the field of view with the first beam, the second beam, and the third beam. For example, the scanner may include one or more mirrors that rotate along two axes to scan the field of view with the first beam, the second beam, and the third beam in two dimensions. In some implementations, the scanner may include a silicon MEMS.

In some implementations, the scanner may receive the first beam, the second beam, and the third beam at different angles, as shown in FIG. 3A. When the scanner receives the first beam, the second beam, and the third beam at different angles, the scanner may reflect the first beam, the second beam, and the third beam at different angles from each other to scan the field of view.

As shown in FIG. 3B, the scanner may receive the first beam, the second beam, and the third beam reflected from the field of view (Reflected Beam 1, Reflected Beam 2, and Reflected Beam 3, respectively) and may provide the first beam, the second beam, and the third beam reflected from the field of view to the dispersive optics. In some implementations, the scanner may include one or more moveable mirrors to receive the first beam, the second beam, and the third beam reflected from the field of view and may provide the first beam, the second beam, and the third beam reflected from the field of view to the dispersive optics. For example, the scanner may include one or more moveable mirrors to scan the field of view with the first beam, the second beam, and the third beam and receive the first beam, the second beam, and the third beam reflected from the field of view.

As shown in FIG. 3B, the dispersive optics may receive, from the scanner, the first beam, the second beam, and the third beam reflected from the field of view. In some implementations, the dispersive optics may multiplex the first beam, the second beam, and the third beam reflected from the field of view to form a second multiplexed beam reflected from the field of view (e.g., a multiplexed beam of reflected beams). For example, the dispersive optics may refract, reflect, and/or the like the first beam, the second beam, and the third beam reflected from the field of view to form the second multiplexed beam reflected from the field of view. In some implementations, the dispersive optics may have optical properties such that when the first multiplexed beam is incident on a first surface of the dispersive optics, the dispersive optics may emit the first beam, the second beam, and the third beam from a second surface of the dispersive optics, as shown in FIG. 3A. Additionally, or alternatively, the dispersive optics may have optical properties such that when the first beam, the second beam, and the third beam reflected from the field of view are incident on the second surface, the dispersive optics may emit, from the first surface, the second multiplexed beam reflected from the field of view.

As shown in FIG. 3B, the circulator may receive the second multiplexed beam reflected from the field of view. In some implementations, the circulator may direct the second multiplexed beam reflected from the field of view to the wavelength demultiplexing component instead of back to the dispersive optics or to the wavelength multiplexing component.

As shown in FIG. 3B, the wavelength demultiplexing component may receive, from the circulator, the second multiplexed beam reflected from the field of view and demultiplex, using wavelength division demultiplexing, the first beam, the second beam, and the third beam reflected from the field of view. For example, the wavelength demultiplexing component may demultiplex the first beam, the second beam, and the third beam reflected from the field of view from the second multiplexed beam reflected from the field of view. In some implementations, the wavelength demultiplexing component may include a circulator, one or more beam splitters, one or more lenses, one or more dispersive optics, and/or the like.

As shown in FIG. 3B, the first receiver may receive, from the wavelength demultiplexing component, the first beam reflected from the field of view and the second receiver may receive, from the wavelength demultiplexing component, the second beam reflected from the field of view. In some implementations, the third receiver may receive, from the wavelength demultiplexing component, the third beam reflected from the field of view. In some implementations, the first receiver, the second receiver, and/or the third receiver may include one or more photodiodes (e.g., an array of photodiodes and/or the like) and/or the like. For example, the first receiver, the second receiver, and/or the third receiver may include a silica-on-silicon waveguide receiver, a silicon oxynitride-on-silicon waveguide receiver, and/or the like. In some implementations, the first receiver, the second receiver, and/or the third receiver may be on a photonic integrated chip (PIC).

In some implementations, the first receiver, the second receiver, and/or the third receiver may convert the first beam, the second beam, and/or the third beam reflected from the field of view into an electrical signal, which the optical device 300 may use to construct a point cloud to determine three-dimensional aspects of an object in the field of view.

In some implementations, the optical device 300 may include a local oscillator beam, which may be a portion of the first beam, a portion of the second beam, and/or a portion of the third beam. In some implementations, the optical device 300 may include one or more mixers to receive the local oscillator portion of the first beam and mix the first beam reflected from the field of view with the portion of the first beam to generate a mixed first beam. In some implementations, the one or more mixers may receive the local oscillator portion of the second beam and mix the second beam reflected from the field of view with the portion of the second beam to generate a mixed second beam. In some implementations, the one or more mixers may receive the local oscillator portion of the third beam and mix the third beam reflected from the field of view with the portion of the third beam to generate a mixed third beam.

In some implementations, the first receiver may receive, from the one or more mixers, the mixed first beam and may generate a first difference-frequency signal. In some implementations, the second receiver may receive, from the one or more mixers, the mixed second beam to generate a second difference-frequency signal. In some implementations, the third receiver may receive, from the one or more mixers, the mixed third beam to generate a third difference-frequency signal. In some implementations, the optical device 100 may, based on the first difference-frequency signal, the second difference-frequency signal, and/or the third difference-frequency signal, determine three-dimensional aspects of an object in the field of view In some implementations, the optical device 300 may include a delay-line interferometer, which may be used as a frequency reference for controlling the laser. For example, the first receiver, the second receiver, the third receiver, and the delay-line interferometer may be integrated. In some implementations, the delay-line interferometer may receive, from the local oscillator and/or the one or more mixers, a portion of the first beam, a portion of the second beam, and/or a portion of the third beam and may provide frequency feedback to control the laser.

In some implementations, the optical device 300 may include an optomechanical bench to hold one or more components of the optical device 300. For example, the optomechanical bench may hold the laser, the optical component, the wavelength multiplexing component, the circulator, the dispersive optics, the scanner, the wavelength demultiplexing component, the first receiver, the second receiver, and/or the third receiver. In some implementations, the optomechanical bench may maintain optical and/or mechanical alignment of components of the optical device 300.

In some implementations, the optical device 300 may include a housing surrounding one or more components of the optical device 300. For example, the housing may surround the laser, the optical component, the wavelength multiplexing component, the circulator, the dispersive optics, the scanner, the wavelength demultiplexing component, the first receiver, the second receiver, the third receiver, and/or the optomechanical bench. In some implementations, the housing may be sealed (e.g., hermetically sealed and/or the like) to prevent external gas, dust, debris, and/or the like from affecting the components of the optical device 300.

In some implementations, the housing may include a window through which the scanner may scan the field of view with the first beam, the second beam, and the third beam. For example, the window may transmit light, be scratch-resistant, and/or protect the components of the optical device 300. In some implementations, the window may include a glass substrate, a sapphire substrate, and/or the like.

In this way, the optical device 300 may scan the field of view with three beams (the first beam, the second beam, and the third beam), using a single laser, a single optical system, and a single scanner, thereby adding a second and a third beam without potentially trebling the cost of the optical device 300.

Figure 4A:
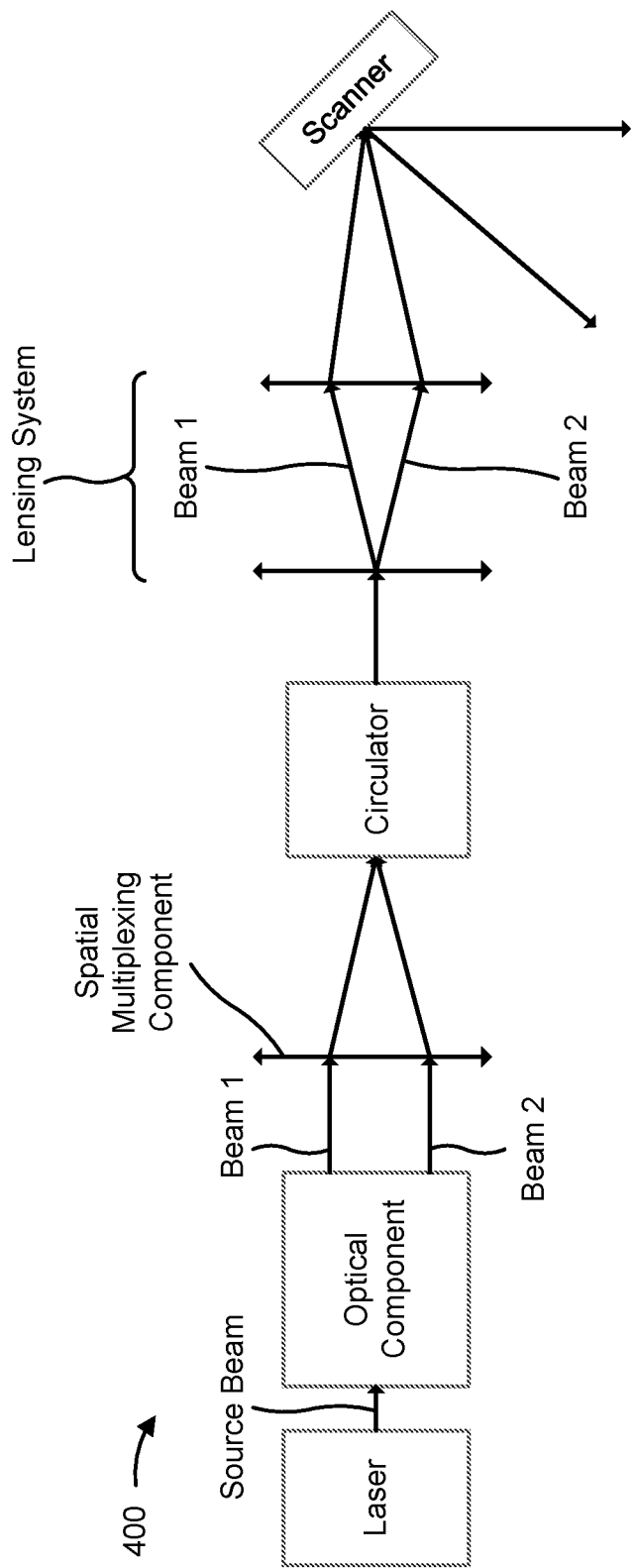
FIGS. 4A-4B are diagrams of an example optical device using spatial division multiplexing described herein.
Figure 4B:
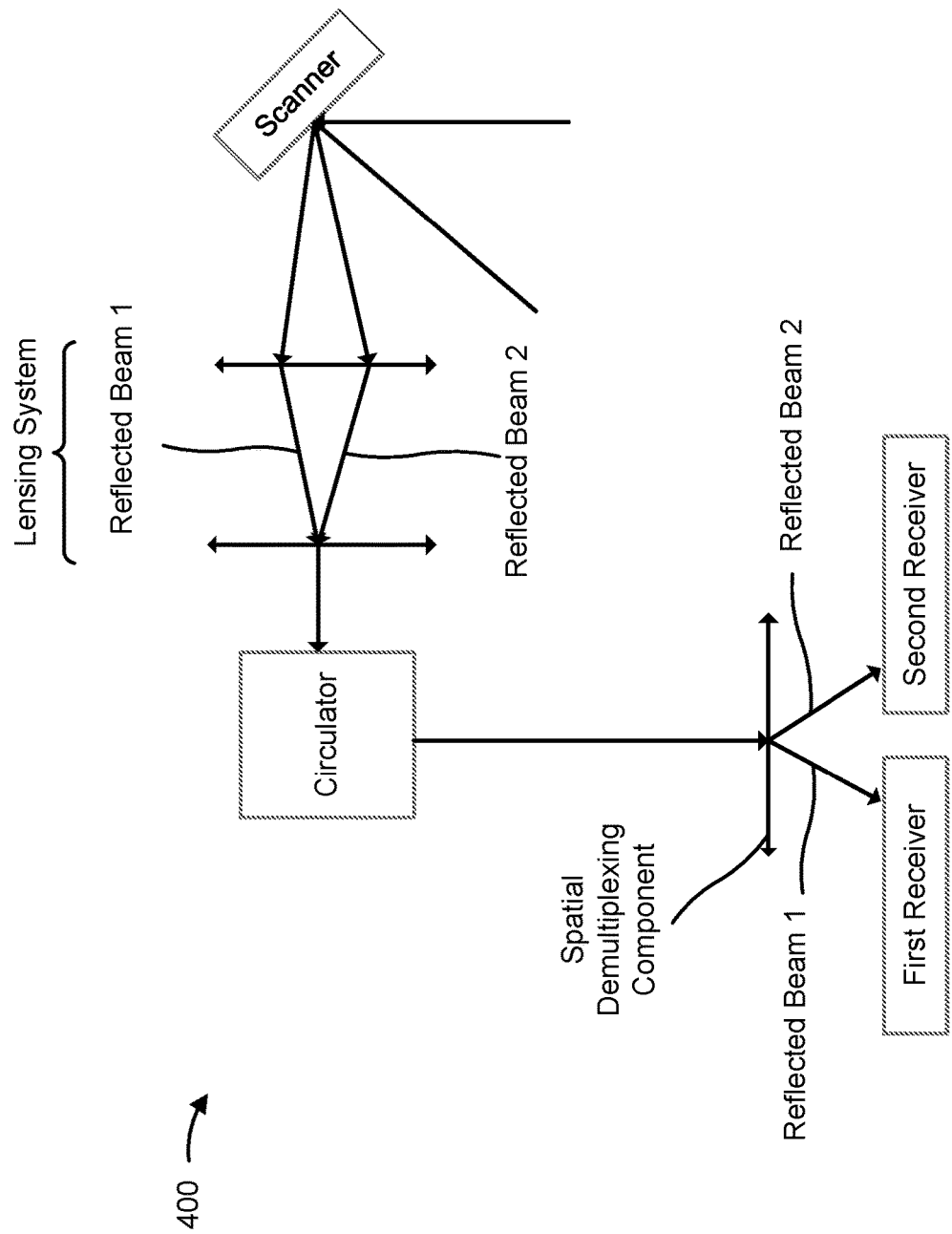

FIGS. 4A-4B are diagrams of an example optical device 400 using spatial division multiplexing described herein. As shown in FIGS. 4A-4B, the optical device 400 may include a laser, an optical component, a spatial multiplexing component, a circulator, a lensing system, a scanner, a spatial demultiplexing component, a first receiver, and a second receiver.

As shown in FIG. 4A, the laser may emit a source beam. In some implementations, the laser may emit a frequency-modulated source beam. For example, the laser may include a frequency-modulated, continuous-wave laser source. In some implementations, the laser may include a narrow-line-width laser source. In some implementations, the laser may include an integrated indium phosphide laser. For example, the laser may include a frequency-modulated, continuous-wave, narrow-line-width, integrated indium phosphide laser.

As shown in FIG. 4A, the optical component may split the source beam to generate a first beam (Beam 1) and a second beam (Beam 2), where the first beam and the second beam have different spatial offsets (e.g., from an optical axis and/or the like). For example, the optical component may include a beam splitter to split the frequency-modulated source beam to generate the first beam having a first spatial offset and the second beam having a second spatial offset. In some implementations, the optical component may split the source beam to generate the first beam, the second beam, and a third beam, where the first beam has a different spatial offset from the second beam and the third beam, and the second beam has a different spatial offset from the third beam. In some implementations, the optical component may include one or more multi-faceted mirrors.

In some implementations, the optical component may include one or more amplifiers to amplify beams generated by splitting the frequency-modulated source beam. For example, the optical component may include a first amplifier to amplify the first beam and a second amplifier to amplify the second beam. In some implementations, the one or more amplifiers may include a solid-state amplifier, a semiconductor optical amplifier (SOA), and/or the like.

As shown in FIG. 4A, the spatial multiplexing component may multiplex the first beam and the second beam to form a first multiplexed beam. For example, the spatial multiplexing component may use spatial division multiplexing to multiplex the first beam and the second beam to form the first multiplexed beam.

In some implementations, the laser, the optical component, and/or the spatial multiplexing component may be integrated. For example, the laser, the optical component, and/or the spatial multiplexing component may be on a photonic integrated chip (PIC).

As shown in FIG. 4A, the circulator may receive the first multiplexed beam. In some implementations, the circulator may have multiple ports and may direct the first multiplexed beam from one port to another port to prevent the first multiplexed beam from propagating in an unintended direction. For example, the circulator may direct the first multiplexed beam to the lensing system instead of back to the spatial multiplexing component or to the spatial demultiplexing component (shown in FIG. 4B).

As shown in FIG. 4A, the lensing system may receive the first multiplexed beam from the circulator and may demultiplex the first beam and the second beam. In some implementations, the lensing system may include a beam splitter that may split the first multiplexed beam to generate the first beam (Beam 1) and the second beam (Beam 2). In some implementations, the lensing system may include a cube beam splitter, a plate beam splitter, a lateral displacement beam splitter, and/or the like.

In some implementations, the lensing system may include a converging lens that may receive the first beam and the second beam from the beam splitter and refract the first beam and the second beam such that the first beam and the second beam are directed onto the same location on the scanner. Additionally, or alternatively, the lensing system may include one or more additional lenses, such as simple lenses (e.g., converging lenses, diverging lenses, and/or the like) and/or compound lenses, one or more optical elements (e.g., prisms, mirrors, and/or the like), and/or the like.

As shown in FIG. 4A, the scanner may receive, from the lensing system, the first beam and the second beam and may scan a field of view with the first beam and the second beam. In some implementations, the scanner may include one or more moveable mirrors to scan the field of view with the first beam and the second beam. For example, the scanner may include one or more mirrors that rotate along two axes to scan the field of view with the first beam and the second beam in two dimensions. In some implementations, the scanner may include a silicon MEMS.

In some implementations, the scanner may receive the first beam and the second beam at different angles, as shown in FIG. 4A. When the scanner receives the first beam and the second beam at different angles, the scanner may reflect the first beam and the second beam at different angles from each other to scan the field of view.

As shown in FIG. 4B, the scanner may receive the first beam and the second beam reflected from the field of view (Reflected Beam 1 and Reflected Beam 2, respectively) and may provide the first beam and the second beam reflected from the field of view to the lensing system. In some implementations, the scanner may include one or more moveable mirrors to receive the first beam and the second beam reflected from the field of view and may provide the first beam and the second beam reflected from the field of view to the lensing system. For example, the scanner may include one or more moveable mirrors to scan the field of view with the first beam and the second beam and receive the first beam and the second beam reflected from the field of view.

As shown in FIG. 4B, the lensing system may receive, from the scanner, the first beam and the second beam reflected from the field of view. In some implementations, the converging lens of the lensing system may refract the first beam and the second beam reflected from the field of view such that the first beam and the second beam reflected from the field of view converge where the beam splitter is positioned.

As shown in FIG. 4B, the beam splitter may receive the first beam and the second beam reflected from the field of view and may multiplex the first beam and the second beam reflected from the field of view to form a second multiplexed beam reflected from the field of view (e.g., a multiplexed beam of reflected beams). In some implementations, the beam splitter may have optical properties such that when the first multiplexed beam is incident on a first surface of the beam splitter, the beam splitter may emit the first beam and the second beam from a second surface of the beam splitter, as shown in FIG. 4A. Additionally, or alternatively, the beam splitter may have optical properties such that when the first beam and the second beam reflected from the field of view are incident on the second surface, the beam splitter may emit, from the first surface, the second multiplexed beam reflected from the field of view.

As shown in FIG. 4B, the circulator may receive the second multiplexed beam reflected from the field of view. In some implementations, the circulator may direct the second multiplexed beam reflected from the field of view to the spatial demultiplexing component instead of back to the beam splitter or to the spatial multiplexing component.

As shown in FIG. 4B, the spatial demultiplexing component may receive, from the circulator, the second multiplexed beam reflected from the field of view and demultiplex, using spatial division demultiplexing, the first beam and the second beam reflected from the field of view. For example, the spatial demultiplexing component may demultiplex the first beam and the second beam reflected from the field of view from the second multiplexed beam reflected from the field of view. In some implementations, the spatial demultiplexing component may include a circulator, one or more beam splitters, one or more lenses, one or more dispersive optics, and/or the like.

As shown in FIG. 4B, the first receiver may receive, from the spatial demultiplexing component, the first beam reflected from the field of view, and the second receiver may receive, from the spatial demultiplexing component, the second beam reflected from the field of view. In some implementations, the first receiver and/or the second receiver may include one or more photodiodes (e.g., an array of photodiodes and/or the like) and/or the like. For example, the first receiver and/or the second receiver may include a silica-on-silicon waveguide receiver, a silicon oxynitride-on-silicon waveguide receiver, and/or the like. In some implementations, the first receiver and the second receiver may be on a photonic integrated chip (PIC).

In some implementations, the first receiver and/or the second receiver may convert the first beam and/or the second beam reflected from the field of view into an electrical signal, which the optical device 400 may use to construct a point cloud to determine three-dimensional aspects of an object in the field of view.

In some implementations, the optical device 400 may include a local oscillator beam, which may be a portion of the first beam and/or a portion of the second beam. In some implementations, the optical device 400 may include one or more mixers to receive the local oscillator portion of the first beam and mix the first beam reflected from the field of view with the portion of the first beam to generate a mixed first beam. In some implementations, the one or more mixers may receive the local oscillator portion of the second beam and mix the second beam reflected from the field of view with the portion of the second beam to generate a mixed second beam.

In some implementations, the first receiver may receive, from the one or more mixers, the mixed first beam and may generate a first difference-frequency signal. In some implementations, the second receiver may receive, from the one or more mixers, the mixed second beam to generate a second difference-frequency signal. In some implementations, the optical device 400 may, based on the first difference-frequency signal and/or the second difference-frequency signal, determine three-dimensional aspects of an object in the field of view.

In some implementations, the optical device 400 may include a delay-line interferometer, which may be used as a frequency reference for controlling the laser. For example, the first receiver, the second receiver, and the delay-line interferometer may be integrated. In some implementations, the delay-line interferometer may receive, from the local oscillator and/or the one or more mixers, a portion of the first beam and/or a portion of the second beam and may provide frequency feedback to control the laser.

In some implementations, the optical device 400 may include an optomechanical bench to hold one or more components of the optical device 400. For example, the optomechanical bench may hold the laser, the optical component, the spatial multiplexing component, the circulator, the lensing system, the scanner, the spatial demultiplexing component, the first receiver, and/or the second receiver. In some implementations, the optomechanical bench may maintain optical and/or mechanical alignment of components of the optical device 400.

In some implementations, the optical device 400 may include a housing surrounding one or more components of the optical device 400. For example, the housing may surround the laser, the optical component, the spatial multiplexing component, the circulator, the lensing system, the scanner, the spatial demultiplexing component, the first receiver, the second receiver, and/or the optomechanical bench. In some implementations, the housing may be sealed (e.g., hermetically sealed and/or the like) to prevent external gas, dust, debris, and/or the like from affecting the components of the optical device 400.

In some implementations, the housing may include a window through which the scanner may scan the field of view with the first beam and the second beam. For example, the window may transmit light, be scratch-resistant, and/or protect the components of the optical device 400. In some implementations, the window may include a glass substrate, a sapphire substrate, and/or the like.

In this way, the optical device 400 may scan the field of view with two beams (the first beam and the second beam), using a single laser, a single optical system, and a single scanner, thereby adding a second beam without doubling the cost of the optical device 400.

As indicated above, FIGS. 1A-4B are provided merely as one or more examples. Other examples may differ from what is described with regard to FIGS. 1A-4B. For example, the optical device may split the source beam into four or more beams (e.g., four beams, six beams, eight beams, twelve beams, and/or the like), which further increases the field of view and/or the density of the point cloud without increasing the cost of the optical device by a factor equivalent to the number of beams. Additionally, or alternatively, the optical device may use combinations of polarization division multiplexing, wavelength division multiplexing, and/or spatial division multiplexing to multiplex beams and combinations of polarization division demultiplexing, wavelength division demultiplexing, and/or spatial division demultiplexing to demultiplex multiplexed beams.

The number and arrangement of components shown in FIGS. 1A-4B are provided as one or more examples. In practice, there may be additional components, fewer components, different components, or differently arranged components than those shown in FIGS. 1A-4B. Furthermore, two or more components shown in FIGS. 1A-4B may be implemented within a single component, or a single component shown in FIGS. 1A-4B may be implemented as multiple, distributed components. Additionally, or alternatively, a set of components (e.g., one or more components) of optical device 100, optical device 200, optical device 300, and optical device 400 may perform one or more functions described as being performed by another set of components.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical device, comprising:
a laser component to emit a source beam, wherein the laser component comprises a frequency-modulated, continuous-wave laser source;
an optical component including:
a polarization beam splitter to split the source beam to generate a first beam and a second beam, the first beam having a polarization that is substantially orthogonal to a polarization of the second beam, and
one or more amplifiers to amplify the first beam and the second beam generated by splitting the source beam;
a multiplexing component to multiplex the first beam and the second beam to form a first multiplexed beam;
an optical system that includes a circulator that is to receive the first multiplexed beam,
wherein the optical system is to demultiplex the first multiplexed beam to obtain the first beam and the second beam;
a scanning component to:
receive, from the optical system, the first beam and the second beam,
scan a field of view with the first beam and the second beam,
receive the first beam reflected from the field of view and the second beam reflected from the field of view, and
provide the first beam reflected from the field of view and the second beam reflected from the field of view to the optical system, wherein the optical system is to multiplex the first beam reflected from the field of view and the second beam reflected from the field of view to form a second multiplexed beam reflected from the field of view;
a demultiplexing component to receive, from the optical system, the second multiplexed beam reflected from the field of view and demultiplex the second multiplexed beam reflected from the field of view to obtain the first beam reflected from the field of view and the second beam reflected from the field of view;
a first receiver to receive, from the demultiplexing component, the first beam reflected from the field of view;
a second receiver to receive, from the demultiplexing component, the second beam reflected from the field of view; and
an optomechanical bench that holds the laser component, the optical component, the multiplexing component, the optical system, the scanning component, the demultiplexing component, the first receiver, and the second receiver in optical and mechanical alignment.

2. The optical device of claim 1, wherein the frequency-modulated, continuous-wave laser source comprises a narrow-line-width laser source.

3. The optical device of claim 1, wherein the laser component comprises an integrated indium phosphide laser.

4. The optical device of claim 1, wherein the scanning component comprises a grating on a silicon micro-electromechanical system.

5. The optical device of claim 1, wherein the scanning component comprises a silicon micro-electromechanical system.

6. The optical device of claim 1, wherein at least one of the first receiver or the second receiver comprises at least one of a silica-on-silicon waveguide receiver or a silicon oxynitride-on-silicon waveguide receiver.

7. The optical device of claim 1, wherein the optical system further comprises a lensing system.

8. The optical device of claim 1, comprising a housing to surround the laser component, the optical component, the multiplexing component, the optical system, the scanning component, and the demultiplexing component.

9. An optical device, comprising:
a laser component to emit a frequency-modulated source beam;
an optical component including:
a polarization beam splitter to split the frequency-modulated source beam to generate a first beam and a second beam, the first beam having a polarization that is substantially orthogonal to a polarization of the second beam, and
one or more amplifiers to amplify the first beam and the second beam generated by splitting the frequency-modulated source beam;
a multiplexing component to multiplex the first beam and the second beam to form a first multiplexed beam;
an optical system that includes a circulator that is to receive the first multiplexed beam, wherein the optical system is to demultiplex the first multiplexed beam to obtain the first beam and the second beam;
a scanning component to:
   receive, from the optical system, the first beam and the second beam,
   scan a field of view with the first beam and the second beam,
   receive the first beam reflected from the field of view and the second beam reflected from the field of view, and
   provide the first beam reflected from the field of view and the second beam reflected from the field of view to the optical system, wherein the optical system is to multiplex the first beam reflected from the field of view and the second beam reflected from the field of view to form a second multiplexed beam reflected from the field of view;
a demultiplexing component to receive, from the optical system, the second multiplexed beam reflected from the field of view and demultiplex the second multiplexed beam reflected from the field of view to obtain the first beam reflected from the field of view and the second beam reflected from the field of view;
a first receiver to receive, from the demultiplexing component, the first beam reflected from the field of view;
a second receiver to receive, from the demultiplexing component, the second beam reflected from the field of view; and
an optomechanical bench that holds the laser component, the optical component, the multiplexing component, the optical system, the scanning component, the demultiplexing component, the first receiver, and the second receiver in optical and mechanical alignment.

10. The optical device of claim 9, wherein the optical system further comprises a lensing system.

11. The optical device of claim 9, wherein the laser component, the optical component, and the multiplexing component are on a photonic integrated chip.

12. The optical device of claim 9, wherein the optical system comprises a converging lens to refract the first beam and the second beam onto a same location on the scanning component.

13. The optical device of claim 9, wherein:
the first receiver is to convert the first beam reflected from the field of view into a first signal;
the second receiver is to convert the second beam reflected from the field of view into a second signal; and
the optical device is to construct, using the first signal and the second signal, a point cloud and to determine, using the point cloud, three-dimensional aspects of an object in the field of view.

14. The optical device of claim 9, wherein the scanning component comprises a silicon micro-electromechanical system.

15. The optical device of claim 9, wherein the multiplexing component is to use polarization division multiplexing when multiplexing the first beam and the second beam to form the first multiplexed beam.

16. The optical device of claim 9, further comprising a housing that surrounds the laser component, the optical component, the multiplexing component, the optical system, the scanning component, the demultiplexing component, the first receiver, the second receiver, and the optomechanical bench.

* * * * *